UNITED STATES PATENT OFFICE.

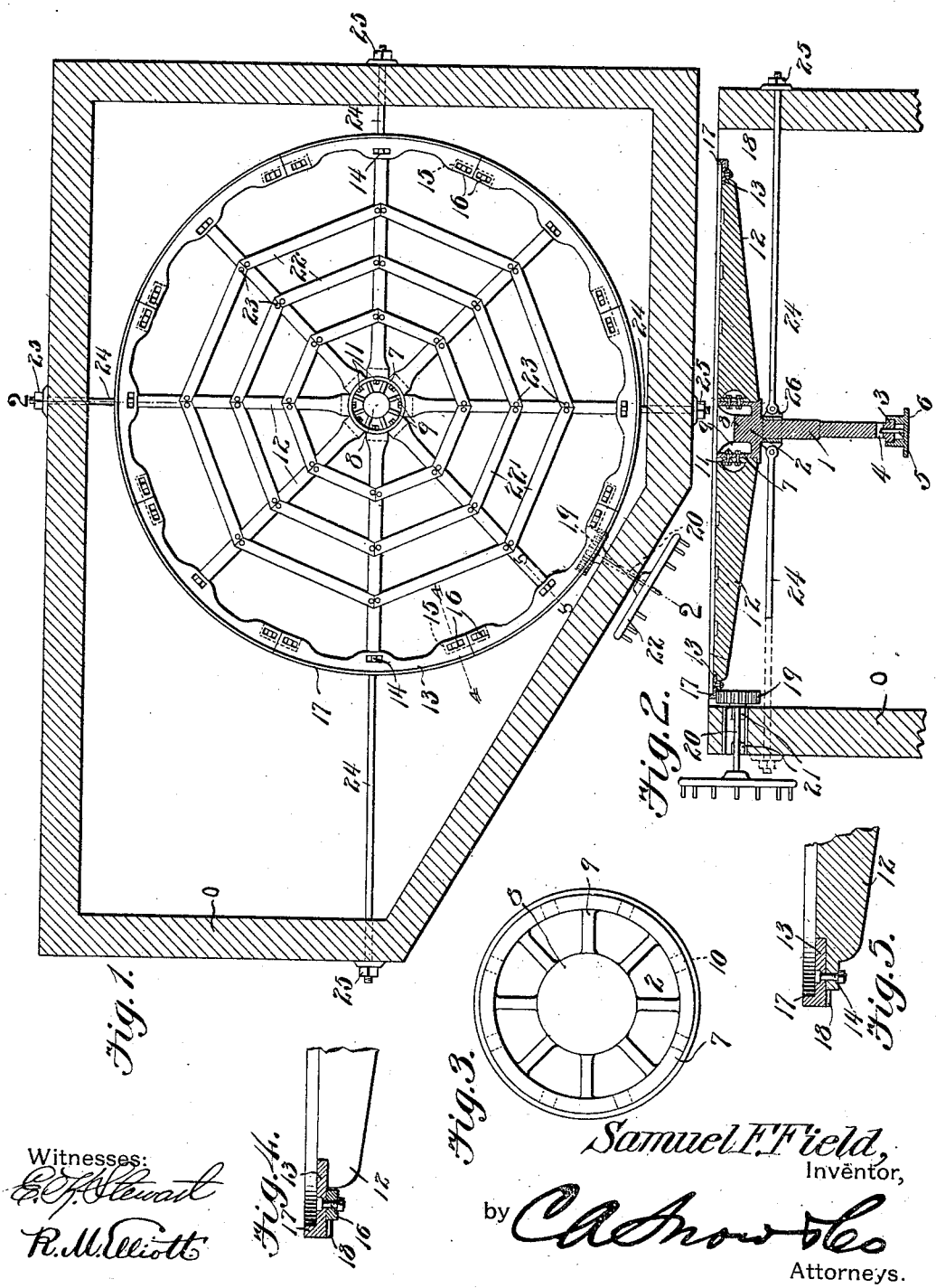

SAMUEL F. FIELD, OF FINDLAY, OHIO.

FLATTENING-WHEEL FOR GLASS HOUSES.

No. 825,310.      Specification of Letters Patent.      Patented July 10, 1906.

Application filed September 12, 1905. Serial No. 278,163.

*To all whom it may concern:*

Be it known that I, SAMUEL F. FIELD, a citizen of the United States, residing at Findlay, in the county of Hancock and State of Ohio, have invented a new and useful Flattening-Wheel for Glass Houses, of which the following is a specification.

This invention relates to flattening-wheels for glass houses.

The object of the invention is to simplify the construction and increase the efficiency of such wheels by reducing the number of parts thereof to a minimum and combining them in such manner as to secure the greatest stability and wear-resisting qualities with a practical avoidance of derangement in use.

With the above and other objects in view, as will appear as the nature of the invention is better understood, the same consists in the novel construction and combination of parts of a flattening-wheel for glass houses, as will be hereinafter fully described and claimed.

In the accompanying drawings, forming a part of this specification, and in which like characters of reference indicate corresponding parts, Figure 1 is a view in plan of a flattening-wheel constructed in accordance with the present invention. Fig. 2 is a vertical sectional view taken on the line 2 2, Fig. 1. Fig. 3 is a view in plan, on an enlarged scale, of the supporting-hub of the wheel. Fig. 4 is a transverse sectional view taken on the line 4 4, Fig. 1. Fig. 5 is a similar view on the line 5 5, Fig. 1.

The present invention resides in the peculiar manner of constructing the wheel-supporting shaft and hub and in the means for driving the wheel, and for this reason no detail description will be furnished of the oven O, which may be of the usual or any preferred construction.

One of the essential features of the invention resides in the wheel-supporting shaft 1, which is shown as cast or otherwise integrally combined with a hub 2. In machines of this character of the ordinary construction, the shaft and hub are separate elements, and this necessitates an accurate fitting of these parts that is expensive and which it is of advantage to obviate. This is secured in the manner shown. The lower portion of the shaft is provided with a head 3 and with a transverse orifice 4, and disposed at the center of the long diameter of the shaft is a bearing-pin 5, which is adapted to engage the bottom of a seat 6, the head 3 serving to hold the shaft centered relatively to the seat. In order to extend the life of the shaft, the bearing-pin is made detachable, which is effected by driving a drift or other suitable tool through the orifice 4.

The hub 2, to which reference has been made and which, as shown in detail in Fig. 3, comprises a rim 7, a central boss 8, and a plurality of arms or ribs 9, connecting the rim and the boss. The rim is provided with orifices 10, which are engaged by bolts 11, that serve to hold or clamp to the head the wheel-arms 12, which may be of the construction shown in Fig. 1 or of any other desired contour. Ordinarily the hub of the supporting-shaft is made polygonal, and the inner terminals of the arms have to be accurately planed to fit the faces thereof; but by making the hub circular, as shown, the inner ends of the arms may be cast on a curve to fit the hub and be securely combined therewith by the bolts 11. Secured to the outer terminals of the arms is a circular rack-plate 13, which is composed of a series of segments, the intermediate portions of each of which are bolted to the arms 12 at 14 and the terminals of which are connected by plates 15 and bolts 16, the series of segments being provided with a marginal upstanding flange 17 to hold the glass cylinders against centrifugal movement relatively to the wheel. The under side of the segments are provided with teeth 18, preferably cast integral therewith and which are designed to engage a pinion 19, carried by a shaft 20, mounted in double bearings 21 in the wall of the oven, the outer end of the shaft having combined with it a hand-wheel 22, by which the shaft 20 may be turned. The upper face of the arms have connected with them flat plates 22', arranged in concentric polygons and combined with the arms by bolts 23.

The shaft 1 is held against any tilting movement by means of tie-rods 24, of which there are in this instance four shown, although this number may be increased if found necessary or desirable, the outer ends of the rods being projected through the oven-walls and have combined with them nuts 25, whereby the rods may be placed under requisite tension to hold the shaft 1 centered and in vertical position. The inner ends of these rods are secured to a winged collar 26, which is mounted on the shaft beneath the hub, and thus operates to secure proper rotation of the shaft.

The improvements herein described, while simple in character, will be found thoroughly efficient in use for the purposes designed and will materially reduce the cost of production and increase the stability and efficiency of wheels of the character described.

Having thus described the invention, what is claimed is—

1. A glass-flattening wheel comprising a shaft having a hub combined therewith, a collar mounted upon the shaft beneath the hub and provided with wings, tie-rods having their inner terminals secured to the wings and their outer terminals rigidly combined with the oven-walls, arms having their inner terminals bolted to the hubs, segmental rack-plates secured to the outer terminals of the arms, plates secured to the upper sides of the arms, a shaft mounted in bearings in the oven-wall, a pinion carried by one end of the shaft and engaging the rack-plates, and a hand-wheel carried by the other end of the shaft.

2. A glass-flattening wheel comprising a shaft having a hub combined therewith, a collar mounted upon the shaft beneath the hub and provided with wings, tie-rods having their inner terminals secured to the wings and their outer terminals rigidly combined with the oven-walls, arms having their inner terminals bolted to the hubs, segmental rack-plates secured to the outer terminals of the arms, plates secured to the upper sides of the arms, double bearings arranged within the oven-wall, a shaft mounted in the bearings, a pinion carried by one end of the shaft and engaging the rack-plates, and a hand-wheel carried by the other end of the shaft.

In testimony that I claim the foregoing as my own I have hereto affixed my signature in the presence of two witnesses.

SAMUEL F. $\times$ FIELD.
his
mark

Witnesses:
H. C. MILLY,
J. D. BARNETT.